United States Patent
Chamberlain et al.

(10) Patent No.: US 12,507,710 B2
(45) Date of Patent: Dec. 30, 2025

(54) FROZEN CONFECTION

(71) Applicant: Conopco, Inc., Englewood Cliffs, NJ (US)

(72) Inventors: Dorothy Margaret Chamberlain, Wellingborough (GB); Rafaella Sammouti, Sheffield (GB); Paul Leonard Sherwood, Rushden (GB)

(73) Assignee: Conopco, Inc., Englewood Cliffs, NJ (US)

(*) Notice: Subject to any disclaimer, the term of this patent is extended or adjusted under 35 U.S.C. 154(b) by 464 days.

(21) Appl. No.: 17/913,426

(22) PCT Filed: Mar. 15, 2021

(86) PCT No.: PCT/EP2021/056578
§ 371 (c)(1),
(2) Date: Sep. 21, 2022

(87) PCT Pub. No.: WO2021/190982
PCT Pub. Date: Sep. 30, 2021

(65) Prior Publication Data
US 2023/0116604 A1 Apr. 13, 2023

(30) Foreign Application Priority Data
Mar. 23, 2020 (EP) .................. 20164817

(51) Int. Cl.
A23G 9/34 (2006.01)
A23G 9/28 (2006.01)
A23G 9/32 (2006.01)
A23G 9/38 (2006.01)

(52) U.S. Cl.
CPC .............. *A23G 9/327* (2013.01); *A23G 9/28* (2013.01); *A23G 9/34* (2013.01); *A23G 9/38* (2013.01)

(58) Field of Classification Search
CPC .................. A23G 9/28; A23G 9/34
See application file for complete search history.

(56) References Cited

U.S. PATENT DOCUMENTS

| | | | |
|---|---|---|---|
| 4,346,120 A | 8/1982 | Morley et al. | |
| 4,452,823 A | 6/1984 | Connolly et al. | |
| 2003/0134024 A1 | 7/2003 | Malone | |
| 2004/0161503 A1 | 8/2004 | Malone et al. | |
| 2004/0175462 A1 | 9/2004 | Riviere et al. | |
| 2005/0095336 A1 | 5/2005 | Maletto | |
| 2006/0286248 A1 | 12/2006 | Anfinsen et al. | |
| 2007/0275131 A1* | 11/2007 | Bertini ............... | A23G 9/00 426/115 |
| 2009/0274798 A1 | 11/2009 | Cox | |
| 2014/0030416 A1 | 1/2014 | Sabbagh | |
| 2015/0305390 A1 | 10/2015 | Vrljic et al. | |
| 2015/0335042 A1 | 11/2015 | D'Agostino | |
| 2016/0302463 A1 | 10/2016 | Woodyer et al. | |
| 2017/0360063 A1* | 12/2017 | Farr ................... | A23G 9/42 |
| 2018/0132506 A1 | 5/2018 | Meiron et al. | |
| 2018/0192667 A1 | 7/2018 | Barey | |
| 2019/0021361 A1 | 1/2019 | Mayes et al. | |
| 2019/0045826 A1 | 2/2019 | Barata et al. | |

FOREIGN PATENT DOCUMENTS

| | | | |
|---|---|---|---|
| CA | 1151939 | 8/1983 | |
| CN | 101416677 | 4/2009 | |
| CN | 103211078 | 7/2013 | |
| CN | 103349148 | 10/2013 | |
| CN | 102870951 | 3/2014 | |
| CN | 104114477 | 10/2014 | |
| CN | 106387287 | 2/2017 | |
| CN | 106578324 | 4/2017 | |
| CN | 107912016 | 4/2018 | |
| CN | 107960523 | 4/2018 | |
| CN | 108601370 | 9/2018 | |
| CN | 109820086 | 5/2019 | |
| CN | 109953173 | 7/2019 | |
| EP | 0328322 | 2/1989 | |
| EP | 1321043 | 3/2006 | |
| EP | 1650133 | 4/2006 | |
| EP | 1967077 A2 * | 9/2008 | ............ A23G 9/38 |
| EP | 1967077 | 10/2008 | |
| EP | 3236771 | 12/2015 | |
| JP | 2007259760 | 10/2007 | |
| WO | WO8501421 | 4/1985 | |
| WO | WO02080693 | 10/2002 | |
| WO | WO2005070223 | 8/2005 | |
| WO | WO2007039158 | 4/2007 | |
| WO | WO2009065724 | 5/2009 | |
| WO | WO2010124976 | 11/2010 | |
| WO | WO2013107465 | 7/2013 | |
| WO | WO2014095307 | 6/2014 | |
| WO | WO2015153666 | 10/2015 | |
| WO | WO2017001265 | 1/2017 | |
| WO | WO2017037111 | 3/2017 | |
| WO | WO2017133863 | 8/2017 | |
| WO | WO2018224328 | 12/2018 | |
| WO | WO2019228957 | 12/2019 | |

OTHER PUBLICATIONS

Brown-Riggs, "Functional Fibers". Dec. 2013 https://www.todaysdietition.com. pp. 1-6. (Year: 2013).*
Search Report and Written Opinion in EP20164816; Sep. 21, 2020.
Search Report and Written Opnion in EP20164817; Oct. 1, 2020.
PCTEP202156577; May 12, 2021.
Written Opinion in PCTEP2021056578; May 28, 2021.
Co-pending U.S. Appl. No. 17/913,425, filed Sep. 21, 2022, entitled Frozen Confection.
Li et al.; Quantiative NMR Studies of Multiple Compound Mixtures ; Annual Reports on NMR Spectroscopy; 2017; pp. 85-143; vol. 90.

* cited by examiner

*Primary Examiner* — Jenna A Watts
(74) *Attorney, Agent, or Firm* — Pabst Patent Group LLP

(57) ABSTRACT

A frozen confection comprising: 25 wt % to 40 wt % freezing point depressants having a number average molecular weight of 200 g mol$^{-1}$ to 275 g mol$^{-1}$; distilled monoglycerides in an amount of 0.04 wt % to 1 wt %; and soluble fibre in an amount of 1.4 wt % to 15 wt %.

17 Claims, 1 Drawing Sheet

FROZEN CONFECTION

FIELD OF THE INVENTION

The present invention relates to frozen confections, in particular frozen confections that are formulated to be easy to dispense across a relatively broad temperature range.

BACKGROUND OF THE INVENTION

Systems for dispensing frozen confections such as ice cream have been developed in recent years. For example, ice cream may be packaged in flexible pouches that can be squeezed by hand to extrude ice cream, or alternatively in piston-type cartridges or bag-in-bottle containers from which the ice cream can be dispensed by a dispensing device. Such systems typically employ frozen confection formulations that are specifically formulated to be dispensed at the desired low temperatures.

For example, US 2004/0161503 discloses a frozen product which comprises a cartridge containing a frozen aerated confection which is soft at −18° C. and which is capable of being extruded from the cartridge at this temperature. The frozen aerated confection has an overrun of above 20% and below 100%, and contains less than 1.5% w/w glycerol, freezing point depressants in an amount of between 25% and 37% w/w, and between 2% and 12% fat, wherein the freezing point depressants have a number average molecular weight $\langle M \rangle_n$ of less than 300.

WO 2017/133863 discloses a frozen confection which is formulated to be dispensed from containers at low temperatures. The frozen confection comprises freezing point depressants in an amount of from 25 to 35% by weight of the frozen confection, wherein the number average molecular weight of the freezing point depressants is from 200 to 250 g mol$^{-1}$, and wherein the freezing point depressants comprise erythritol in an amount of from 0.25 to 7% by weight of the frozen confection.

Existing frozen confection formulations can usually only be dispensed within a narrow temperature range. If the temperature is too low, then the frozen confection is too hard to be dispensed. On the other hand, if the temperature is too high, then the frozen confection is too fluid to provide a pleasing consumer experience either in terms of appearance and/or organoleptic properties. As such, there remains a need to develop improved formulations for use in systems for dispensing frozen confections like soft ice. In particular, the present inventors have recognised that there is a need for frozen confection formulations which are readily extrudable over a wider temperature range.

SUMMARY OF THE INVENTION

The inventors have found that improved frozen confection formulations can be provided by using a specific amount and type of freezing point depressant in combination with soluble fibre and a particular type of emulsifier. Thus, the present invention is directed to a frozen confection comprising freezing point depressants in an amount of 25 wt % to 40 wt %, wherein the number average molecular weight $\langle M \rangle_n$ of the freezing point depressants is 200 g mol$^{-1}$ to 275 g mol$^{-1}$; distilled monoglycerides in an amount of 0.04 wt % to 1 wt %; and soluble fibre in an amount of 1.4 wt % to 15 wt %.

DETAILED DESCRIPTION OF THE INVENTION

The present invention relates to a frozen confection. As used herein the term frozen confection means a confection intended for consumption in the frozen state (i.e. where the temperature of the confection is less than 0° C., and preferably wherein the confection comprises significant amounts of ice). Examples of frozen confections include ice creams, frozen yoghurts, gelatos, and sherbets. In particular, the present invention relates to frozen confection formulations which are extrudable at low temperatures (e.g. the temperature of a domestic freezer, which is usually around −18° C.).

The amount of ice in the frozen confection is, to a large extent, determined by the amount and molecular weight of the freezing point depressants in the formulation. If the amount of ice is too high, then the frozen confection becomes difficult to extrude at low temperatures found in some domestic freezers. This is especially problematic if the frozen confection is designed to be extruded from flexible pouches that are squeezed by hand. Thus, the frozen confection comprises freezing point depressants in an amount of at least 25 wt %, and preferably in amount of at least 26 wt %, at least 27 wt % or even at least 28 wt %.

Freezing point depressants as defined in this invention consist of:
  monosaccharides and disaccharides;
  oligosaccharides formed from 3 to 10 monosaccharide monomers:
  corn syrups with a dextrose equivalent (DE) of 20 or more, preferably 40 or more, or 60 or more;
  sugar alcohols, preferably selected from: erythritol, arabitol, glycerol, xylitol, sorbitol, mannitol, lactitol maltitol, and mixtures thereof;
  ethanol.

The average molecular weight for a mixture of freezing point depressants is defined by the number average molecular weight $\langle M \rangle_n$ which can be calculated using the following equation:

$$\langle M \rangle_n = \frac{\sum w_i}{\sum (w_i/M_i)} = \frac{\sum N_i M_i}{\sum N_i}$$

where $w_i$ is the mass of species i, $M_i$ is the molar mass of species i and $N_i$ is the number of moles of species i of molar mass $M_i$.

As mentioned above, the freezing point depressants may comprise certain corn syrups. Corn syrups are complex multi-component sugar mixtures and dextrose equivalent (DE) is a common means of classification. As set out in Chirife et al. (*J. Food Eng.* 1997 33: 221-226), the number average molecular weight $\langle M \rangle_n$ of corn syrups can be calculated using the following equation:

$$\langle M \rangle_n = \frac{18016}{DE}$$

In order to provide a frozen confection which is extrudable at low temperatures—even when squeezed by hand, the number average molecular weight $\langle M \rangle_n$ of the freezing point depressants in the frozen confection no more than 275 g mol$^{-1}$. Preferably the number average molecular weight $\langle M \rangle_n$ of the freezing point depressants in the frozen confection is no more than 260 g mol$^{-1}$, no more than 245 g mol$^{-1}$, or even no more than 230 g mol$^{-1}$.

The present inventors have also realised that if the amount of freezing point depressants becomes too high and/or their molecular weight becomes too low, then the rheology of the frozen confection will become too fluid at higher temperatures such as those that may be encountered in the frozen supply chain. Increased fluidity is considered problematic since it is associated with loss of microstructure. Thus, the frozen confection comprises freezing point depressants in an amount of no more than 40 wt %, and preferably in amount of up to 38 wt %, up to 36 wt % or even up to 34 wt %.

In addition, the number average molecular weight $<M>_n$ of the freezing point depressants in the frozen confection of the present invention is at least 200 g mol$^{-1}$. Preferably the number average molecular weight $<M>_n$ of the freezing point depressants in the frozen confection is at least 202 g mol$^{-1}$, at least 204 g mol$^{-1}$, or even at least 206 g mol$^{-1}$.

The present inventors have found that frozen confections that are formulated with specific amounts and types of freezing point depressants as described herein are sensitive to temperature fluctuations—such as those which may be experienced in the frozen supply chain. Without wishing to be bound by theory, the inventors believe that the very factors that allow for easy extrusion at low temperatures confer poor microstructural stability at elevated temperatures—even if the confection remains frozen. The present inventors have found that employing certain emulsifier systems provide frozen confections with improved temperature stability.

The frozen confection comprises distilled monoglycerides, either alone or in combination with other emulsifiers. Distilled monoglycerides are commercially available, for example from DuPont Nutrition & Biosciences under the Dimodan® brand. The frozen confection comprises distilled monoglycerides in an amount of at least 0.04 wt %, preferably at least 0.05 wt %, or even at least 0.06 wt %. With regard to improving the temperature stability, higher amounts of distilled monoglycerides are more effective. However, this has to be balanced against the fact that very high levels can lead to off-flavours and/or may harden the frozen confection product (and thus adversely impact its extrudability). Therefore, the frozen confection comprises distilled monoglycerides in an amount of no more than 1 wt %, preferably no more than 0.6 wt %, no more than 0.5 wt %, or even or no more than 0.4 wt %.

As mentioned above, the amount of ice in the frozen confection is, to a large extent, determined by the amount and molecular weight of the freezing point depressants in the formulation. Controlling the amount and type of freezing point depressants can provide frozen confections which are extrudable at low temperatures. However, the inventors have found that the temperature range over which the frozen confection formulations which are readily extrudable can be extended by including soluble fibre in the formulation. Thus the frozen confection of the present invention comprises soluble fibre in an amount of 1.4 wt % to 15 wt %. The soluble fibre is usually derived from the grains of cereal crops, such as corn (also called maize), wheat, rice, barley or oats. The soluble fibre is preferably soluble corn fibre. Soluble corn fibre is commercially available, for example from Tate & Lyle under the Promitor® brand. Additionally or alternatively, the soluble fibre may be polydextrose (commercially available, for example from Tate & Lyle under the STA-LITE® brand) or maltodextrin having a dextrose equivalent (DE) of less than 20 (commercially available, for example from Cargill).

Whilst nutritionally speaking stabilisers are sometimes considered to be a source of soluble fibre, they are not encompassed by the term "soluble fibre" as used herein. Thus, for the purpose of the present application, none of the following are considered to be soluble fibre: alginates (E400-E405), carrageenan (E407), locust bean gum (E410), guar gum (E412), pectin (E440), xanthan gum (E415) and sodium carboxymethyl cellulose (E466).

The frozen confection preferably comprises soluble fibre in an amount of at least 1.6 wt %, at least 1.8 wt %, or even at least 2 wt %. The frozen confection preferably comprises soluble fibre in an amount of no more than 12 wt %, no more than 10 wt %, no more than 8 wt %, or even no more than 5 wt %.

It is preferred than the soluble fibre contains less than 10 wt % of saccharides (i.e. monosaccharides, disaccharides and oligosaccharides). The soluble fibre preferably comprises less than 8 wt %, less than 5 wt %, or even less than 2 wt % of saccharides.

The frozen confection preferably comprises protein in an amount of from 0.5 wt % to 10 wt %, preferably in an amount of from 0.8 wt % to 8 wt %, or 1 wt % to 6 wt %.

The protein preferably comprises milk protein. The source of the milk protein is not critical. For example, the milk protein may be provided as milk (concentrated, skimmed or whole), skimmed milk powder, whey powders, whey protein concentrate, whey protein isolate, buttermilk, buttermilk powder, of a mixture thereof. The milk protein is preferably selected from: casein, whey proteins, and mixtures thereof. It is particularly preferred that the milk protein is provided in the form of skimmed milk powder (which typically comprises around 34 wt % milk protein—a combination of casein and whey proteins). It is especially preferred than the protein comprises pulse protein in addition to milk protein. The pulse protein is preferably selected from: bean protein, lentil protein, lupin protein, pea protein, soy protein, and mixtures thereof. For example, the pulse protein may comprise pea protein, soy protein, or a mixture thereof. It is particularly preferred that the pulse protein is pea protein.

When the protein comprises milk protein and pulse protein, the relative amounts of pulse protein and milk protein are preferably controlled in order to further improve temperature stability. Therefore, the weight ratio of pulse protein to milk protein is preferably from 1:2 to 1:10, from 1:2 to 1:6, from 1:2 to 2:11, from 1:2 to 1:5, from 2:5 to 1:10, from 2:5 to 1:6, from 2:5 to 2:11, from 2:5 to 1:5, from 1:3 to 1:10, from 1:3 to 1:6, from 1:3 to 2:11, or even from 1:3 to 1:5.

The amount of milk protein in the frozen confection will depend to a certain extent on the type of frozen confection and local regulations. Regardless of whether or not the frozen confection comprises pulse protein, it is preferred that the amount of milk protein is at least 2 wt %, at least 2.4 wt %, at least 2.8 wt %, or even at least 3.2 wt %. It is preferred than the amount of milk protein is no more than 8 wt %, no more than 7 wt %, no more than 6 wt %, or even no more than 5 wt %. Since high levels of pulse protein are associated with undesirable mouthfeel characteristics (such as grittiness), it is preferred that when the frozen confection comprises pulse protein, it comprises the pulse protein in an amount of 0.2 wt % to 1 wt %, 0.3 wt % to 0.8 wt %, or 0.3 wt % to 0.7 wt %.

The frozen confection preferably comprises fat in an amount of 1 wt % to 15 wt %, from 4 wt % to 12 wt %, or even from 5 wt % to 10 wt %. The fat is preferably milk fat or vegetable fat (such as coconut oil, palm oil, palm kernel oil, or a mixture thereof). For example, the fat may comprise milk fat, coconut oil, or a mixture thereof. It is particularly preferred that the fat is coconut oil.

As set out above, the frozen confection comprises distilled monoglycerides, either alone or in combination with other emulsifiers. It is preferred that the total amount of emulsifier in the frozen confection is 0.05 wt % to 1 wt %, 0.1 wt % to 0.8 wt %, or 0.15 wt % to 0.6 wt %.

In addition to distilled monoglycerides, the frozen confection preferably additionally comprises an emulsifier selected from: acetic acid esters of mono- and/or diglycerides, lactic acid esters of mono- and/or diglycerides, sucrose esters, mono-diglycerides, and mixtures thereof. This can be instead of or in addition to distilled monoglycerides. Acetic acid esters of mono- and/or diglycerides (E472a; acid esters of mono- and/or diglycerides of fatty acids) are often known by the generic name of ACETEM. Lactic acid esters of mono- and/or diglycerides (E472b; lactic acid esters of mono- and/or diglycerides of fatty acids) are often known by the generic name of LACTEM. Both are available commercially, for example from DuPont Nutrition & Biosciences under the Grinsted® brand. Sucrose esters (E473; sucrose esters of fatty acids) are commercially available, for example from Mitsubishi-Chemical Foods Corporation or Sisterna. The sucrose esters preferably have an HLB (Hydrophilic-Lipophilic Balance) value of 10 to 16. Mono-diglycerides (E471; mono- and di-glycerides of fatty acids) are commercially available, for example from DuPont Nutrition & Biosciences under the Grinsted® brand. Lactic acid esters of mono- and/or diglycerides (E472b; lactic acid esters of mono- and/or diglycerides of fatty acids) are particularly preferred.

The combined amount of acetic acid esters of mono- and/or diglycerides, lactic acid esters of mono- and/or diglycerides, sucrose esters, and mono-diglycerides in the frozen confection is preferably 0.05 wt % to 1 wt %, 0.08 wt % to 0.75 wt %, or 0.1 wt % to 0.5 wt %. As mentioned above, lactic acid esters of mono- and/or diglycerides (E472b; lactic acid esters of mono- and/or diglycerides of fatty acids) are particularly preferred—thus these ranges preferably refer to the amount of lactic acid esters of mono- and/or diglycerides.

Although not essential, the frozen confection typically comprises at least one stabiliser, which is preferably selected from the group consisting of sodium alginate (E401), carrageenan (E407), locust bean gum (E410), guar gum (E412), pectin (E440), xanthan gum (E415) and sodium carboxymethyl cellulose (E466). For example the stabiliser may preferably be selected from the group consisting of locust bean gum, xanthan gum, guar gum, carrageenan, and mixtures thereof (for example, a mixture of locust bean gum and carageenan). The amount of stabiliser in the frozen confection is preferably 0.05 wt % to 2 wt %, 0.1 wt % to 1 wt %, or 0.2 wt % to 0.5 wt %.

The frozen confection may optionally comprise non-nutritive sweetener, such as aspartame, acesulfame K, erythritol, or one or more steviol glycosides such as rebaudioside A.

The frozen confection is preferably aerated. As used herein the term "aerated" means that the confection has an overrun of at least 30%. Preferably the frozen confection has an overrun of 50% to 150%, 70% to 140%, or even 80% to 120%. Overrun (with unit "%") is defined by the following equation:

$$\text{overrun} = \frac{\text{volume of aerated product} - \text{volume of initial mix}}{\text{Volume of initial mix}} \times 100\%$$

Overrun is measured at ambient temperature (20° C.) and atmospheric pressure.

The frozen confection is preferably packaged in container comprising a product outlet and a moveable wall. A dispensing force can be transmitted through the moveable wall thereby causing the frozen confection to be extruded via the product outlet.

Thus, the invention also relates to a packaged frozen product wherein the frozen confection is packaged in a container comprising a product outlet and a moveable wall.

An example of a container comprising a moveable wall is a bag-in-bottle container (where the bag acts as the moveable wall). Such a bag-in-bottle container is described in WO 2007/039158. Another example is a cartridge comprising a plunger (where the plunger acts as the moveable wall). Such a cartridge is disclosed in US 2004/0161503.

The container may be adapted such that the wall is moveable on application of hand pressure. For example, where the frozen confection is packaged in a flexible pouch and squeezing the pouch by hand transmits the dispensing force thereby extruding the frozen confection. Such a flexible pouch is disclosed in WO 2018/224328, which is hereby incorporated by reference in its entirety.

The product outlet can take any form—for example the outlet can be a simple orifice or a spout.

The force needed to dispense the frozen confection from the container is attainable with hand pressure when the container is not too large. As such, the container preferably has a volume of 100 ml to 500 ml. Preferably the container has a volume of up to 475 ml, up to 450 ml, or even up to 400 ml. Preferably the container has a volume of at least 150 ml, at least 200 ml, at least 250 ml, or even at least 300 ml.

The container preferably contains at least one serving of the frozen confection. As such, the frozen confection packaged in the container preferably has a mass of at least 50 g, at least 100 g, at least 150 g, or even at least 175 g. The frozen confection packaged in the container preferably has a mass of no more than 325 g, no more than 300 g, no more than 275 g, or even no more than 250 g.

The frozen confections of the present invention can be manufactured by any suitable method. The frozen confection is typically made by freezing a premix (preferably a pasteurised premix) of ingredients such as water, fat, freezing point depressant, protein (comprising the pulse protein and milk protein), and optionally other ingredients such as emulsifiers, stabilisers, colours and flavours.

Definitions and descriptions of various terms and techniques used in frozen confection manufacture are found in Ice Cream by H. Douglas Goff and Richard W. Hartel (2013, 7$^{th}$ Edition, Kluwer Academic/Plenum Publishers). All percentages and ratios contained herein are calculated by weight (unless otherwise indicated), with the exception of percentages cited in relation to overrun.

As used herein "substantially free of" means that the frozen confection comprises the ingredient in question in an amount of less than 0.1 wt %, preferably less than 0.05 wt %, more preferably less than 0.01 wt %, for example from 0 wt % to 0.01 wt %.

Unless otherwise specified, numerical ranges expressed in the format "from x to y" are understood to include x and y, and in specifying any range of values or amounts, any particular upper value or amount can be associated with any particular lower value or amount.

Except in the examples and comparative experiments, or where otherwise explicitly indicated, all numbers are to be understood as modified by the word "about". As used herein, the indefinite article "a" or "an" and its corresponding definite article "the" means at least one, or one or more, unless specified otherwise.

FIGURES

The cartridges that were used in the examples are as illustrated in the figures, in which.

Figure 1A:
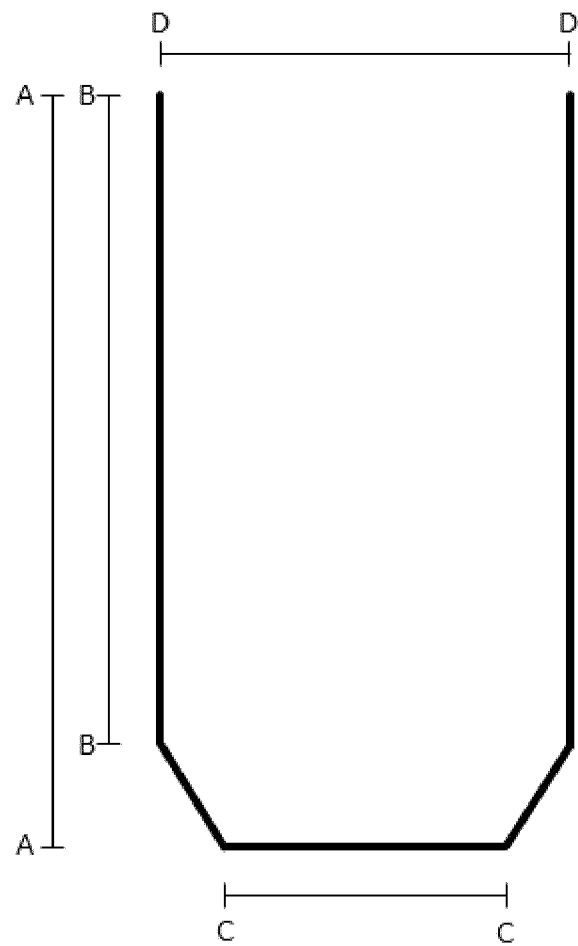
FIG. 1a is a cross-sectional view of the cartridge.
Figure 1B:
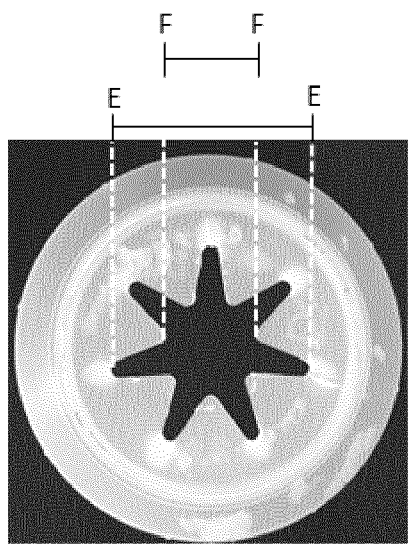
FIG. 1b is a view of the end of the cartridge comprising the aperture.

FIG. 1a shows the cartridge in cross section. The total length of the cartridge A-A is 97 mm. The length B-B is 90 mm (this is the length from the top of the cartridge to the point at which the begins to taper towards the aperture). The end of the cartridge comprising the aperture is 36 mm in diameter (C-C) and the internal diameter of the main body of the cartridge is 52 mm (D-D). The aperture is located at the bottom of the cartridge as orientated in FIG. 1a. FIG. 1b illustrates the shape of the aperture, which has the shape of a regular seven-pointed star, in which E-E is 25 mm and F-F is 9 mm.

EXAMPLES

The following examples are intended to illustrate the invention and are not intended to limit the invention to those examples per se.

Example 1

Four ice creams were made according to the formulations in Table 1. The ice cream samples differed from each other in that each one was formulated using a different emulsifier. The emulsifier in Sample 1 was distilled monoglycerides (supplied by DuPont Nutrition and Biosciences under the Dimodan® brand). The emulsifier in Sample 2 was ACETEM, the emulsifier in Sample 3 was CITREM, and the emulsifier in Sample 4 was LACTEM (all supplied by DuPont Nutrition and Biosciences under the Grinsted® brand).

TABLE 1 ice cream formulations

| Ingredient | Amount (wt %) |
|---|---|
| Coconut oil | 8.0 |
| Skimmed milk powder | 6.9 |
| Dextrose monohydrate | 13.0 |
| Corn syrup (DE63, 78% solids) | 15.5 |
| Erythritol | 3.0 |
| Stabiliser | 0.27 |
| Emulsifier | 0.4 |
| Flavour | 0.28 |
| Colour | 0.01 |
| Water | to 100 |
| Freezing point depressants | 30.4 wt % |
| $\langle M \rangle_n$ | 213 g mol$^{-1}$ |

Briefly, the ingredients (excluding coconut oil) were combined and mixed with heating (60° C. to 75° C.), followed by addition of the coconut oil and further mixing. The mixes were pasteurised and homogenised. The mixes were aged overnight at 4° C. and aerated in a scraped surface heat exchanger (standard ice cream freezer). The air input was controlled to give a target overrun of 100%, and freezing was controlled to give a target extrusion temperature of −9° C.

The frozen mixes were filled directly into pouches with flexible walls having a volume of 400 ml. The pouch wall was made of a laminate film comprising polyethylene terephthalate, orientated polyamide and polyethylene layers, and the shape of the pouch is as illustrated in FIG. 3 of WO 2018/224328 A1. The product outlet was a spout with an internal diameter of 22 mm. Approximately 230 g of ice cream was filled into each pouch through the spout and then a closure cap screwed in place. The ice cream was hardened by placing the pouches in a blast freezer.

Example 2

Pouches containing samples prepared in Example 1 were transferred to a domestic freezer (−18° C.) for several days before testing. The force required to dispense the products was measured, and the overrun of the extruded products was determined. The dispensing force was measured by squeezing each pouch between the plates of an Instron® universal testing machine. Overrun was measured by dispensing a set mass of product, hardening the product by cooling in a dry ice environment, and then determining the volume of the hardened product (by measuring the volume of water displaced when the hardened product was submerged in an iced water bath). The results are shown in Table 2.

TABLE 2 physical assessment results

| Sample | Emulsifier | Dispensing force | Overrun |
|---|---|---|---|
| 1 | Distilled monoglycerides | 250N | 93% |
| 2 | ACETEM | 310N | 97% |
| 3 | CITREM | 360N | 92% |
| 4 | LACTEM | 280N | 96% |

The measured dispensing forces indicate that extrusion from the pouch by hand would be achievable for all four products (i.e. a dispensing force of less than 600 N). None of the samples showed a significant overrun loss on being dispensed.

Example 3

Ice cream samples were made according to the formulations in Tables 3a and 3b. Samples 5 and 9 did not contain any soluble fibre. Samples 6 and 10 contained 2 wt % soluble corn fibre (Promitor® 70 supplied by Tate & Lyle). Samples 7 and 11 contained 2 wt % maltodextrin (C*Dry MD 01958 supplied by Cargill). Samples 8 and 12 contained 1 wt % soluble corn fibre (Promitor® 70) and 1 wt % maltodextrin (C*Dry MD 01958).

TABLE 3a ice cream formulations

| Ingredient (wt %) | Sample | | | |
|---|---|---|---|---|
| | 5 | 6 | 7 | 8 |
| Coconut oil | 8.0 | 8.0 | 8.0 | 8.0 |
| Skimmed milk powder | 6.8 | 6.8 | 6.8 | 6.8 |
| Dextrose monohydrate | 13.0 | 13.0 | 13.0 | 13.0 |
| Corn syrup (DE63, 78% solids) | 15.5 | 15.5 | 15.5 | 15.5 |
| Erythritol | 3.0 | 3.0 | 3.0 | 3.0 |
| Soluble corn fibre | — | 2.0 | — | 1.0 |
| Maltodextrin | — | — | 2.0 | 1.0 |
| Stabiliser | 0.27 | 0.27 | 0.27 | 0.27 |
| Emulsifier (LACTEM) | 0.4 | 0.4 | 0.4 | 0.4 |
| Flavour | 0.28 | 0.28 | 0.28 | 0.28 |
| Colour | 0.01 | 0.01 | 0.01 | 0.01 |
| Water | to 100 | to 100 | to 100 | to 100 |

TABLE 3a-continued ice cream formulations

| | Sample | | | |
|---|---|---|---|---|
| Ingredient (wt %) | 5 | 6 | 7 | 8 |
| Freezing point depressants (wt %) | 30.3 | 30.3 | 30.3 | 30.3 |
| $<M>_n$ (g mol$^{-1}$) | 213 | 213 | 213 | 213 |

TABLE 3b ice cream formulations

| | Sample | | | |
|---|---|---|---|---|
| Ingredient (wt %) | 9 | 10 | 11 | 12 |
| Coconut oil | 8.0 | 8.0 | 8.0 | 8.0 |
| Skimmed milk powder | 6.8 | 6.8 | 6.8 | 6.8 |
| Dextrose monohydrate | 13.0 | 13.0 | 13.0 | 13.0 |
| Corn syrup (DE63, 78% solids) | 15.5 | 15.5 | 15.5 | 15.5 |
| Erythritol | 3.0 | 3.0 | 3.0 | 3.0 |
| Soluble corn fibre | — | 2.0 | — | 1.0 |
| Maltodextrin | — | — | 2.0 | 1.0 |
| Stabiliser | 0.27 | 0.27 | 0.27 | 0.27 |
| Emulsifier (LACTEM) | 0.4 | 0.4 | 0.4 | 0.4 |
| Flavour | 0.42 | 0.35 | 0.35 | 0.42 |
| Colour | 0.01 | 0.01 | 0.01 | 0.01 |
| Water | to 100 | to 100 | to 100 | to 100 |
| Freezing point depressants (wt %) | 30.3 | 30.3 | 30.3 | 30.3 |
| $<M>_n$ (g mol$^{-1}$) | 213 | 213 | 213 | 213 |

Briefly, the ingredients (excluding coconut oil) were combined and mixed with heating (60° C. to 75° C.), followed by addition of the coconut oil and further mixing. The mixes were pasteurised and homogenised. The mixes were aged overnight at 4° C. and aerated in a scraped surface heat exchanger (standard ice cream freezer). The air input was controlled to give a target overrun of 100%, and freezing was controlled to give a target extrusion temperature of −10° C.

The frozen mixes were filled into cartridges (as illustrated in FIG. 1). After filling, the ice cream was hardened by placing the cartridges in a blast freezer.

Example 4

Cartridges containing the samples prepared in Example 3 were transferred to a domestic freezer for several days before testing. Filled cartridges were equilibrated to the appropriate temperature before the assessment, and the force required to dispense the products was measured. An Instron® was used (fitted with an adaptor to house the cartridge), with the plunger was lined up against the lid of the cartridge (shaped to correspond to the tapered portion of the cartridge). Samples were extruded through the cartridge aperture, and the force required to extrude the samples was measured. The results are shown in Table 4.

TABLE 4 physical assessment results

| | Soluble fibre (wt %) | | Dispensing force (N) | | |
|---|---|---|---|---|---|
| Sample | corn fibre | maltodextrin | −22° C. | −20° C. | −18° C. |
| 5 | — | — | —/— | 94 | 76 |
| 6 | 2 | — | 153 | —/— | 71 |
| 7 | — | 2 | 183 | —/— | 83 |

TABLE 4-continued physical assessment results

| | Soluble fibre (wt %) | | Dispensing force (N) | | |
|---|---|---|---|---|---|
| Sample | corn fibre | maltodextrin | −22° C. | −20° C. | −18° C. |
| 8 | 1 | 1 | —/— | 81 | 68 |
| 9 | — | — | 161 | —/— | 78 |
| 10 | 2 | — | —/— | 110 | 105 |
| 11 | — | 2 | —/— | 89 | 84 |
| 12 | 1 | 1 | —/— | 88 | 63 |

The increase in dispensing force for extrusion at −20° C. compared to extrusion at −18° C. C and/or the dispensing force for extrusion at −20° C. is smaller for samples comprising soluble fibre.

Example 5

Five ice creams were made according to the formulations in Table 5.

TABLE 5 ice cream formulations

| | Sample | | | | |
|---|---|---|---|---|---|
| Ingredient (wt %) | 13 | 14 | 15 | 16 | 17 |
| Coconut oil | 8.0 | 8.0 | 8.0 | 8.0 | 8.0 |
| Skimmed milk powder | 6.8 | 6.8 | 6.8 | 6.8 | 6.8 |
| Dextrose monohydrate | 13.0 | 13.0 | 13.0 | 13.0 | 13.0 |
| Corn syrup (DE63, 78% solids) | 15.5 | 15.5 | 15.5 | 15.5 | 15.5 |
| Erythritol | 3.0 | 3.0 | 3.0 | 3.0 | 3.0 |
| Soluble corn fibre | 2.0 | 2.0 | 2.0 | 2.0 | 2.0 |
| Pea protein | 0.5 | 0.5 | 0.5 | 0.5 | 0.5 |
| Stabiliser | 0.27 | 0.27 | 0.27 | 0.27 | 0.27 |
| Distilled monoglycerides | 0.1 | 0.1 | 0.1 | 0.08 | 0.08 |
| Sucrose ester | — | 0.1 | — | — | — |
| LACTEM | — | — | 0.1 | — | — |
| Mono-diglycerides | — | — | — | 0.12 | 0.32 |
| Flavour | 0.35 | 0.35 | 0.35 | 0.35 | 0.35 |
| Colour | 0.01 | 0.01 | 0.01 | 0.01 | 0.01 |
| Water | to 100 | to 100 | to 100 | to 100 | to 100 |

All of the samples contained soluble corn fibre (Promitor® 70 supplied by Tate & Lyle), and distilled monoglycerides (supplied by DuPont Nutrition and Biosciences under the Dimodan® brand). Samples 14 to 17 contained an additional emulsifier in combination with distilled monoglycerides. For Sample 14 this was sucrose ester (S-1670 from Mitsubishi Chemicals). For Sample 14 this was LACTEM, and for Samples 15 and 16 this was mono-diglycerides (all supplied by DuPont Nutrition and Biosciences under the Grinsted® brand).

The ingredients were combined and frozen as described in Example 1. The frozen mixes were filled directly into pouches with flexible walls having a volume of 400 ml. The pouches were as described in Example 1.

Example 6

Pouches containing samples prepared in Example 5 were transferred to a domestic freezer for several days before testing. The force required to dispense the products at −18° C. and −22° C. was measured. Filled pouches were equilibrated at the appropriate temperature before the assessment. The dispensing force was measured by squeezing each pouch between the plates of an Instron® universal testing machine. The results are shown in Table 6.

TABLE 6 physical assessment results

| | Emulsifier system (wt %) | | | | Dispensing force (N) | |
|---|---|---|---|---|---|---|
| Sample | Distilled monoglycerides | Sucrose ester | LACTEM | Mono-diglycerides | −22° C. | −18° C. |
| 13 | 0.1 | — | — | — | 406 | 150 |
| 14 | 0.1 | 0.1 | — | — | 464 | 191 |
| 15 | 0.1 | — | 0.1 | — | 505 | 234 |
| 16 | 0.08 | — | — | 0.12 | 442 | 211 |
| 17 | 0.08 | — | — | 0.32 | 440 | 250 |

The measured dispensing forces indicate that extrusion from the pouch by hand would be achievable for all five products—even at a temperature of −22° C. (i.e. a dispensing force of less than 600 N). The use of an additional emulsifier (i.e. in addition to distilled monoglycerides) tends to increase the dispensing force required for extrusion. This may be desirable, since it may allow the consumer to more precisely control the portion size of the dispensed product.

The invention claimed is:

1. A frozen confection comprising:
   freezing point depressants in an amount of 25 wt % to 40 wt %, wherein the number average molecular weight $<M>_n$ of the freezing point depressants is 200 g mol$^{-1}$ to 275 g mol$^{-1}$, selected from the group consisting of:
   monosaccharides and disaccharides;
   oligosaccharides formed from 3 to 10 monosaccharide monomers;
   corn syrups with a dextrose equivalent (DE) of 20 or more, 40 or more, or 60 or more;
   sugar alcohols optionally selected from: erythritol, arabitol, glycerol, xylitol, sorbitol, mannitol, lactitol, maltitol, and mixtures thereof; and
   ethanol, and combinations thereof;
   distilled monoglycerides in an amount of 0.04 wt % to 1 wt %; and
   soluble fibre in an amount of 1.4 wt % to 15 wt %;
   wherein the soluble fibre is soluble corn fibre.

2. The frozen confection as claimed in claim 1 wherein the frozen confection comprises the freezing point depressants in an amount of 27 wt % to 36 wt %.

3. The frozen confection as claimed in claim 1 wherein the number average molecular weight $<M>_n$ of the freezing point depressants is 204 g mol$^{-1}$ to 245 g mol$^{-1}$.

4. The frozen confection as claimed in claim 1 wherein the frozen confection comprises the soluble fibre in an amount of 1.8 wt % to 12 wt %.

5. The frozen confection as claimed in claim 1 wherein the soluble fibre contains less than 10 wt % of saccharides.

6. The frozen confection as claimed in claim 1 wherein the frozen confection comprises the distilled monoglycerides in an amount of 0.05 wt % to 0.5 wt %.

7. The frozen confection as claimed in claim 1 comprising fat in an amount of 1 wt % to 15 wt %.

8. The frozen confection as claimed in claim 1 comprising protein in an amount of 0.5 wt % to 10 wt %.

9. The frozen confection as claimed in claim 8 wherein the protein comprises pulse protein and milk protein.

10. The frozen confection as claimed in claim 9 wherein the pulse protein is selected from: bean protein, lentil protein, lupin protein, pea protein, soy protein, and mixtures thereof.

11. The frozen confection as claimed in claim 1 wherein the frozen confection additionally comprises an emulsifier selected from: acetic acid esters of mono- and/or diglycerides, lactic acid esters of mono- and/or diglycerides, sucrose esters, mono-diglycerides, and mixtures thereof.

12. A packaged frozen product wherein the frozen confection as claimed in claim 1 is packaged in a container comprising a product outlet and a moveable wall.

13. The packaged frozen product as claimed in claim 12 wherein the container has a volume of 100 ml to 500 ml.

14. The packaged frozen product as claimed in claim 12 wherein the frozen confection packed in the container has a mass of 50 g to 325 g.

15. The frozen confection according to claim 9 wherein the weight ratio of pulse protein to milk protein is from 1:2 to 1:10.

16. The frozen confection according to claim 11 wherein the frozen confection comprises an emulsifier selected from: acetic acid esters of mono- and/or diglycerides, lactic acid esters of mono- and/or diglycerides, sucrose esters, mono-diglycerides, and mixtures thereof, in an amount of 0.05 wt % to 1 wt %.

17. The frozen confection according to claim 1 wherein the frozen confection is selected from the group consisting of ice cream, frozen yoghurt, gelato and sherbet.

* * * * *